United States Patent [19]
Whitney

[11] 3,893,494
[45] July 8, 1975

[54] MULTIPLE GLASS FILLER APPARATUS

[76] Inventor: Robert W. Whitney, 1235 Second Ave., Seattle, Wash. 98109

[22] Filed: June 22, 1973

[21] Appl. No.: 372,661

[52] U.S. Cl. .............................................. 141/244
[51] Int. Cl. ............................................. B65b 3/36
[58] Field of Search ....... 141/84, 98, 118, 121, 124, 141/125, 171, 234, 235, 237–244, 286, 351, 367, 369, 378, 392; 222/166

[56] References Cited
UNITED STATES PATENTS

| | | | |
|---|---|---|---|
| 574,075 | 12/1896 | Robbins | 141/244 X |
| 2,507,269 | 5/1950 | Quayle | 141/244 X |
| 3,311,141 | 3/1967 | Bell | 141/244 |
| 3,580,304 | 5/1971 | Chermack | 141/244 |

Primary Examiner—Richard E. Aegerter
Assistant Examiner—Frederick R. Schmidt
Attorney, Agent, or Firm—Graybeal, Barnard, Uhlir & Hughes

[57] ABSTRACT

Apparatus for simultaneously filling a plurality of glasses mounted in a rack including in one embodiment a rack supporting counter including glass icing, filling, leveling and draining stations. Apparatus at the glass filling station including piping connected directly to the building water supply, distribution tubes extending out of the top surfaces of the piping and valve means regulating the flow of water through the piping. An inclined counter surface is provided over which the tray of filled glasses is moved to tip excess water from the glasses thereby equalizing the volume of water in all glasses. Piping systems suitable for use with glass racks of differing capacity are disclosed as are water flow control systems responsive to contact by the glass rack as it is moved along the counter.

7 Claims, 10 Drawing Figures

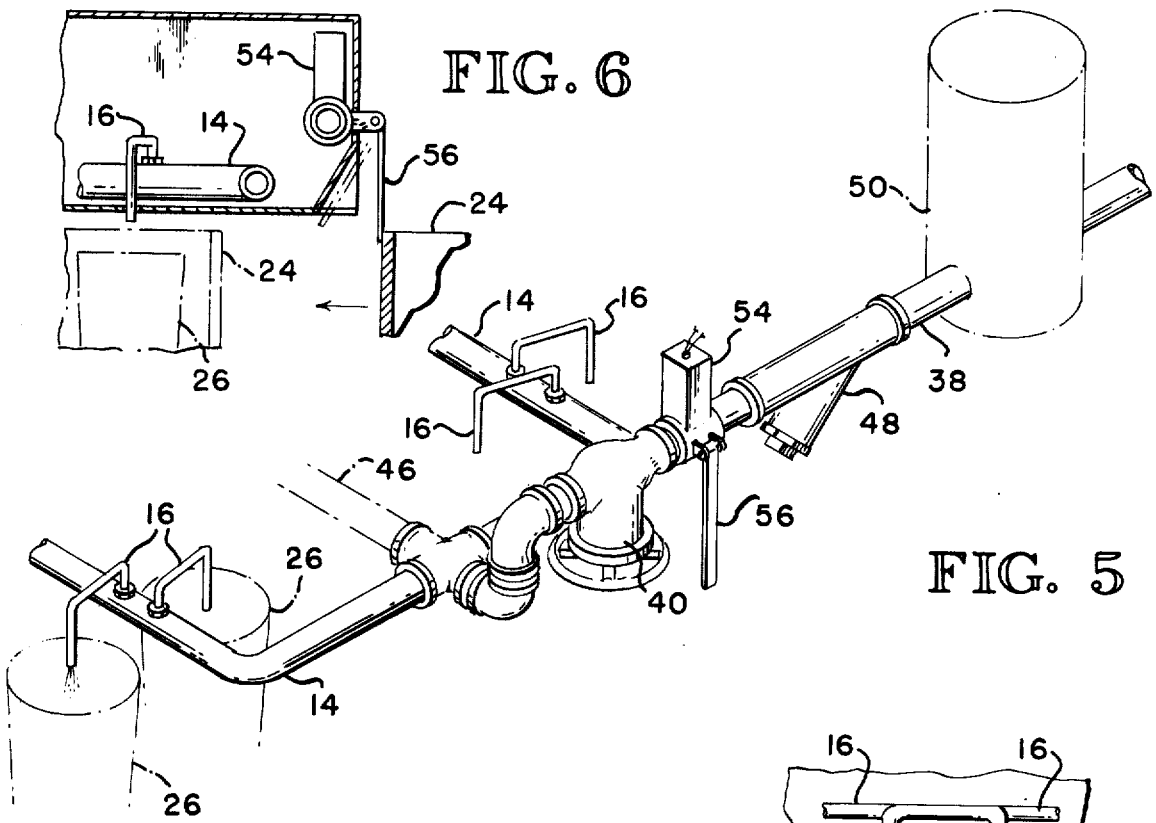
FIG. 6
FIG. 5
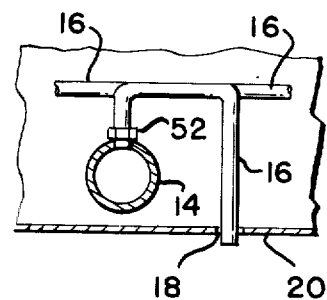
FIG. 3
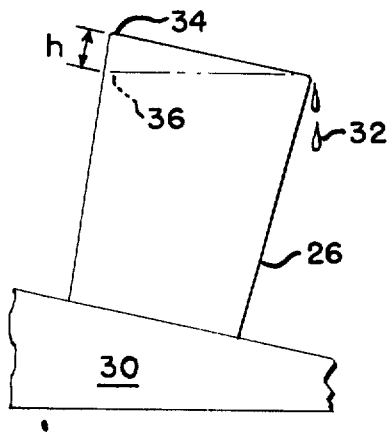
FIG. 4
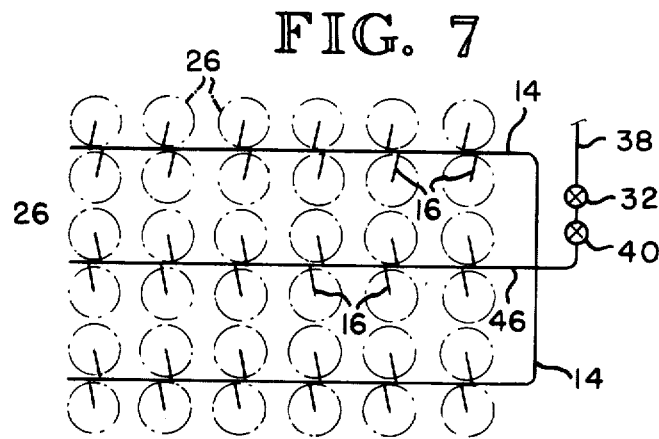
FIG. 7

MULTIPLE GLASS FILLER APPARATUS

BACKGROUND OF THE INVENTION

1. Field of the Invention

This invention relates, in general, to restaurant hardware, and in particular, to apparatus for simultaneously filling an entire rack of glasses with water to a predetermined level.

2. Description of the Prior Art

In the restaurant industry, and particularly in the preparation and serving of banquets, substantial time is commonly spent filling water glasses prior to their distribution to the tables. Both the length of time necessary to fill a great number of glasses by conventional means such as pouring water from a pitcher into each of the glasses or through the use of a hose connected to a water tap, and the difficulty during rapid filling of maintaining the liquid level in all of the glasses at substantially the same level are problems alleviated by the instant invention which provides rapid means for equally filling an entire rack of glasses.

Devices for simultaneously filling bottles or containers of uniform capacity are known in the bottling industry as shown, for example, by U.S. Pat. No. 3,311,141 wherein a plurality of bottles are automatically filled and leveled through the use of a siphon arrangement. Devices for automatically distributing a known volume of fluid simultaneously to a plurality of glasses are also known such as for example U.S. Pat. Nos. 2,872,953, 3,196,909, 3,393,716 and 3,664,387. The 2,872,953 and 3,196,909 patents disclose glass fillers of the simple gravity flow type wherein the liquid to be distributed is dispersed over a circular plate covering all of the glasses and then drained through holes or nipples provided over each of a plurality of glasses. The 3,664,387 patent employs a plurality of funnel shaped members positioned over each of the glasses to be filled, each funnel member being sized to hold a premeasured quantity of liquid equal to the volume of liquid desired to be distributed to each glass. To fill the glasses, the funnels are first filled and then the bottoms of the funnels are simultaneously opened to allow the fluid to drain into the glasses. The 3,393,716 patent discloses a combination multiple drink mixer and glass filler having a pair of top compartments in which a number of drinks are simultaneously mixed, one of the compartments including a plurality of plastic tubes extending downwardly to a point directly over each of the glasses to be filled. These patents all relate to the transferring of equal parts of a predetermined volume of fluid to a plurality of glasses and not to an apparatus suitable for use with a continuous flow fluid source.

BRIEF SUMMARY OF THE INVENTION

The instant invention discloses means for automatically and rapidly filling a plurality of water glasses to a uniform level directly from a constant flow source such as a water tap. The invention includes a plurality of branch pipes extending from a water supply pipe, each of the branch pipes having a plurality of distribution tubes mounted on their top surfaces and extending outwardly to points over each of the glasses which are disposed in a rack positioned on a counter support therebelow. Valve means for controlling the rate of water flow through the branch pipes and distribution tubes, and switch means regulating the flow or no flow condition of water through the pipe are also disclosed. The mounting of the distribution tubes on the tops of the branch pipes prevents water from flowing through any of the distribution tubes until the branch pipes are completely filled at which time the water flows simultaneously through all of the distribution tubes in equal volume regardless of their distance from the original water supply. A glass rack support counter is also disclosed on which the racks of glasses to be filled are moved. The counter includes an inclined portion over which the racks of filled glasses are moved thereby causing varying amounts of water to spill from the glasses to equalize the water levels in all of the filled glasses. Particular branch pipe arrangements are disclosed for use with racks of varying glass capacity and a complete system for icing, filling, leveling and draining water glasses including automatic means for controlling water flow into the glasses in response to movement of the tray to be filled are also disclosed.

It is an object of the instant invention, therefore, to provide unique apparatus for rapidly and relatively automatically filling a plurality of glasses disposed in a rack with substantially equal volumes of water or water and ice.

Another object of the present invention is to provide a multiple glass filling apparatus which is attachable directly to the building water supply.

Still another object is to provide distribution tubes for a multiple glass filling apparatus which flow simultaneously and at equal rates regardless of their distance from the building water supply.

One more object of the instant invention is to provide a glass rack support counter along which racks of glasses to be filled are moved including an inclined portion causing water to spill from the glasses to equalize the water level in all of the glasses in a rack.

Still another object is to provide a multiple glass filling apparatus having alternate piping and selective valve means which may be used with glass racks of differing capacity.

Another object is to provide switch means controlling the flow of water into the glasses in response to contact with racks of glasses moved along the glass rack support counter.

Other and additional objects and advantages will be apparent from the following description taken in conjunction with the accompanying drawings.

BRIEF DESCRIPTION OF THE DRAWINGS

FIG. 3 is a section view taken along line 3—3 in FIG. 2.

FIG. 4 is a diagrammatic view of a glass on an incline illustrating the manner leveling the liquid in the filled glasses.

FIG. 5 is a partial perspective view of the portion of the piping connected to the building water supply of a typical multiple glass filling apparatus made according to the instant invention.

FIG. 6 is a partial sectional elevation view of a typical multiple glass filling apparatus made according to the instant invention including switch means contacted by movement of the glass rack to turn on water flow.

FIG. 7 is a diagrammatic plan view of the branch pipe and water distribution tube arrangement for a 36 glass rack.

DETAILED DESCRIPTION OF THE INVENTION

Figure 1:
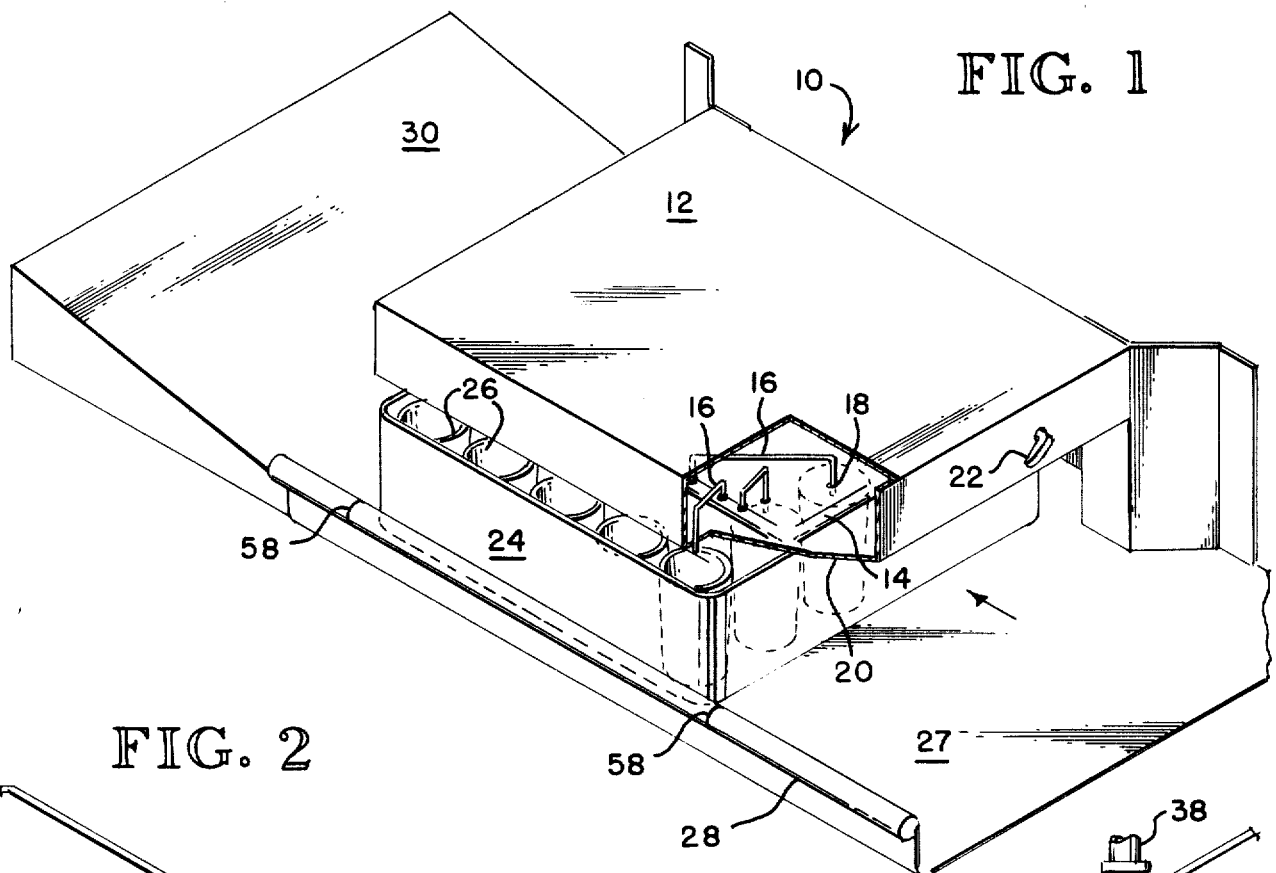
FIG. 1 is a partial perspective view of a typical multiple glass filling apparatus made according to the instant invention and including a rack of glasses to be filled positioned therein.

Referring initially to FIG. 1, a typical multiple glass filling apparatus 10 is disclosed including a cabinet structure 12 enclosing branch pipes 14 having a plurality of water distribution tubes 16 mounted on their top surfaces and extending outwardly to holes 18 in the bottom plate 20 of the cabinet. An off-on water flow valve 22 is shown mounted on one side of cabinet 12 at a position suitable for easy hand actuation to turn the flow of water through the branch pipes and distribution tubes on and off when a rack such as 24 holding a plurality of glasses 26 is positioned thereunder. Glass rack 24 is supported for sliding movement on counter 27 which includes an upward curb or lip 28 along its edge to retain and direct water spillage inwardly to conventional drains which may be mounted in the counter top.

Counter 27 includes an inclined portion 30 up which the rack of glasses is moved after filling to automatically equalize the water level in all of the glasses within the tray. Referring to FIG. 4, the method of equalization of water levels in the glasses is illustrated by glass 26 shown mounted on inclined surface 30 thereby causing excess water 32 in the glass to spill therefrom to reduce the water level in the glass to a level below the top rim 34 of the glass. It will be understood from FIG. 4 that the final water level is equal to one-half the distance $h$, $h$ being the distance along the height of the glass from the lowest water level 36 obtained during tipping and the top rim 34. Little care need be taken in measuring the amount of water initially placed in all of the glasses so long as they are filled to levels above the desired final water level in that the inclining of the glasses to the same degree by moving the rack up slope 30 will cause the water levels in all of the glasses to be equalized. It will be understood that the angle of slope 30 controls the final water level in the glasses and that means may be provided to allow the slope to be varied as desired.

Figure 2:
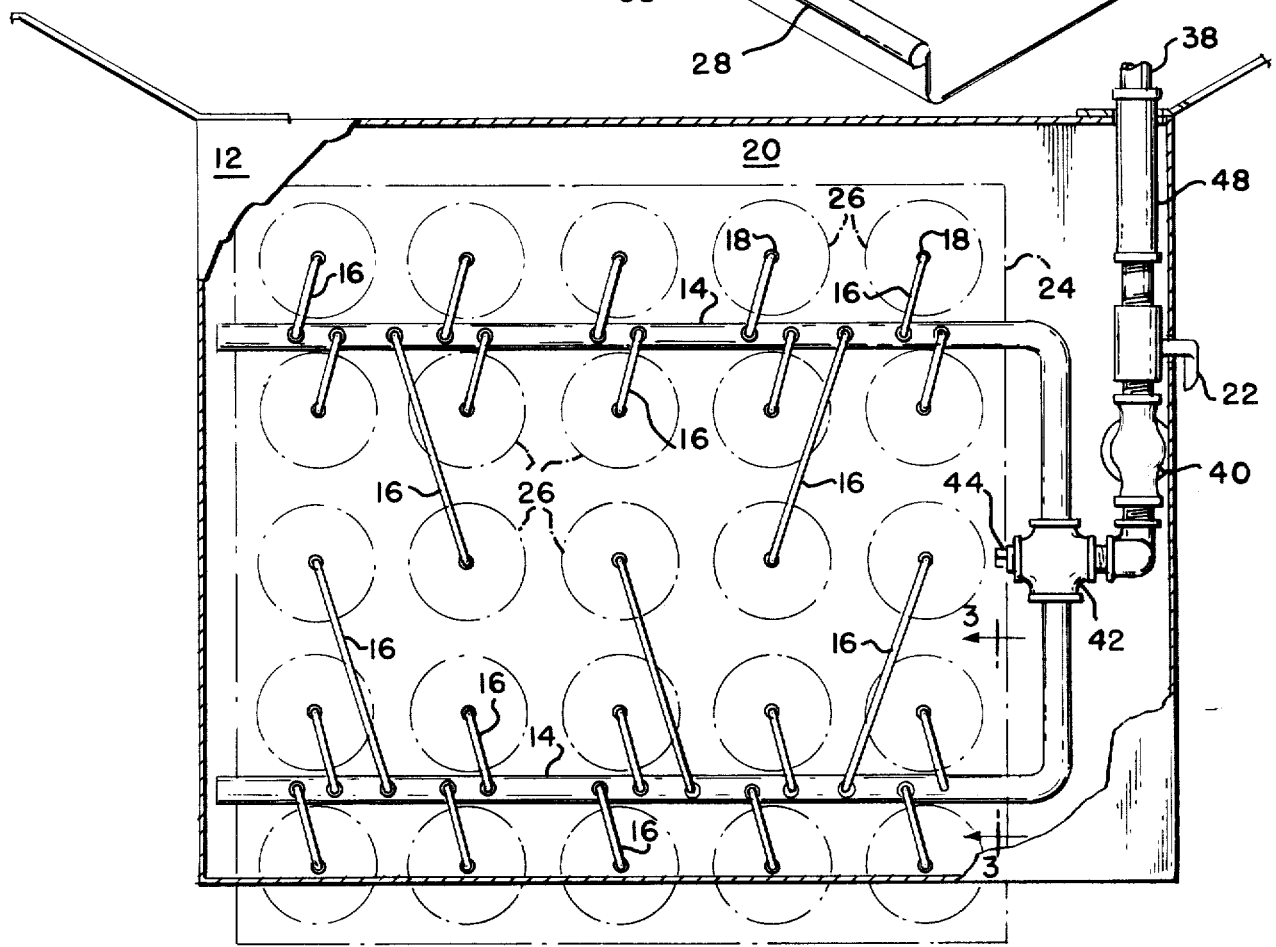
FIG. 2 is a partial sectional plan view of the multiple glass filling apparatus of FIG. 1.

Referring now to FIG. 2, a more detailed view of the laterally spaced branch pipes 14 and their top mounted distribution tubes 16 which extend downwardly to holes 18 in the bottom panel 20 of cabinet 12 and the remaining piping and valve structure whereby water is fed thereto, is disclosed. Water supply pipe 38 is connected directly to the main building water supply and is thus capable of providing a continuous water flow. Conventional off-on valve 22 is mounted on water pipe 38 adjacent flow control gate valve 40 whereby the rate of water flow into branch pipes 14 when valve 22 is in the "on" or "flow" position may be controlled and maintained at a desired level for rapid filling. Tee 42 is mounted downstream from valve 40 and feeds the branch pipes 14. The tee is shown to include a plug 44 which may be removed so that a third branch pipe 46 may be mounted therein as shown in dashed line in FIG. 5. As also seen in FIG. 5, a conventional line strainer 48 is mounted in water supply line 38 while charcoal water filter 50 or the like, shown in dashed line, may also be added to the water supply line if desired or required by water conditions.

In FIGS. 1 and 2, a rack 24 having a 25 glass capacity is shown positioned beneath the glass filler structure and it will be understood that when valve 22 is turned to the "on" position, water from supply line 38 fills branch pipes 14, and only when these branch pipes are completely filled does water begin to flow upwardly and then outwardly through all of the distribution tubes at substantially the same time such that all of the glasses are filled simultaneously at substantially the same rate.

Referring to FIG. 3, it will be seen that branch pipe 14 includes top mounted fittings 52 in which the distribution tubes 16 are mounted. The distribution tubes are preferably formed of copper tubing, although plastic tubing or the like may also be satisfactorily used. FIG. 3 makes clear that until such time as branch pipe 14 is completely filled, no water enters the tubes 16 through fittings 52. The tubes 16 extend vertically upward from branch pipes 14 a short distance before running outwardly and downwardly to their respective holes 18 in the bottom cabinet panel 20. As clearly shown in the embodiment of FIG. 3, the vertical height of the initial sections of all of the distribution tubes are equal and thus the water level must rise to the same height in all of the tubes before flow will begin. The use of relatively rigid distribution tubes allows the equality in vertical tube height to be easily maintained, although it will be understood that flexible tubes may be supported at a uniform level above branch pipes 14 to accomplish the same purpose.

Referring now to FIGS. 5 and 6, the use of a switch and timer mechanism 54 of a known type to control water flow is shown. Switch 54 includes an associated valve structure whereby the flow of water through supply pipe 38 to the multiple glass filling apparatus is normally stopped. However, upon the pivoting of arm 56, as shown in dashed line in FIG. 6, in response to movement of glass rack 24 thereby, water flow is commenced and continues until turned off by a timer mechanism associated with switch 54 after all of the glasses 26 in the tray 24 have been filled. As seen in FIG. 6, once tray 24 has been moved past arm 56, the arm is free to return to its normal vertical position ready for actuation upon contact by another rack. The switch and timer mechanism disclosed at 54, as well as the valve associated therewith, are considered to be of conventional types, a wide variety of which are available on the market, and thus this mechanism has been disclosed only diagrammatically in the accompanying drawings. A number of alternate combinations of switches, timers and valves capable of functioning in the outlined manner may satisfactorily be used to accomplish the disclosed purpose.

Referring again to FIG. 1, tray positioning lines 58 are shown on the curb 28 to allow the operator sliding the tray 24 beneath cabinet 12 to easily center the glasses beneath their respective distribution tubes 16. It will be understood that the positioning of the tray need not be exact in view of the relatively large diameter of the mouths of the glasses to be filled as compared with the diameter of tubes 16. Other conventional modes of marking support counter 27 such as by the addition of a slight ridge on the counter surface, may also be used to allow relatively rapid positioning of the glass rack. As described hereafter with respect to the embodiment of FIGS. 8 and 10, a combination positioning means and switch support may also be used.

Referring now to FIG. 7, a branch pipe and distribution tube arrangement suitable for use with a 36 glass capacity rack is shown including a center branch pipe 46 whereby each branch pipe supports twelve distribution tubes 16. The use of a third branch pipe may provide a shorter fill time than would be the case using the branch piping of the FIG. 2 embodiment. While filling apparatus arrangements for rectangular 25 and 36 glass capacity racks are illustrated herein, it will be understood that like arrangements may be constructed within the teaching of the instant invention for different sized and shaped racks by rearrangement of the holes 18 in the bottom plate of cabinet 12 and the distribution tubes mounted in each hole.

Figures 8, 9, 10:
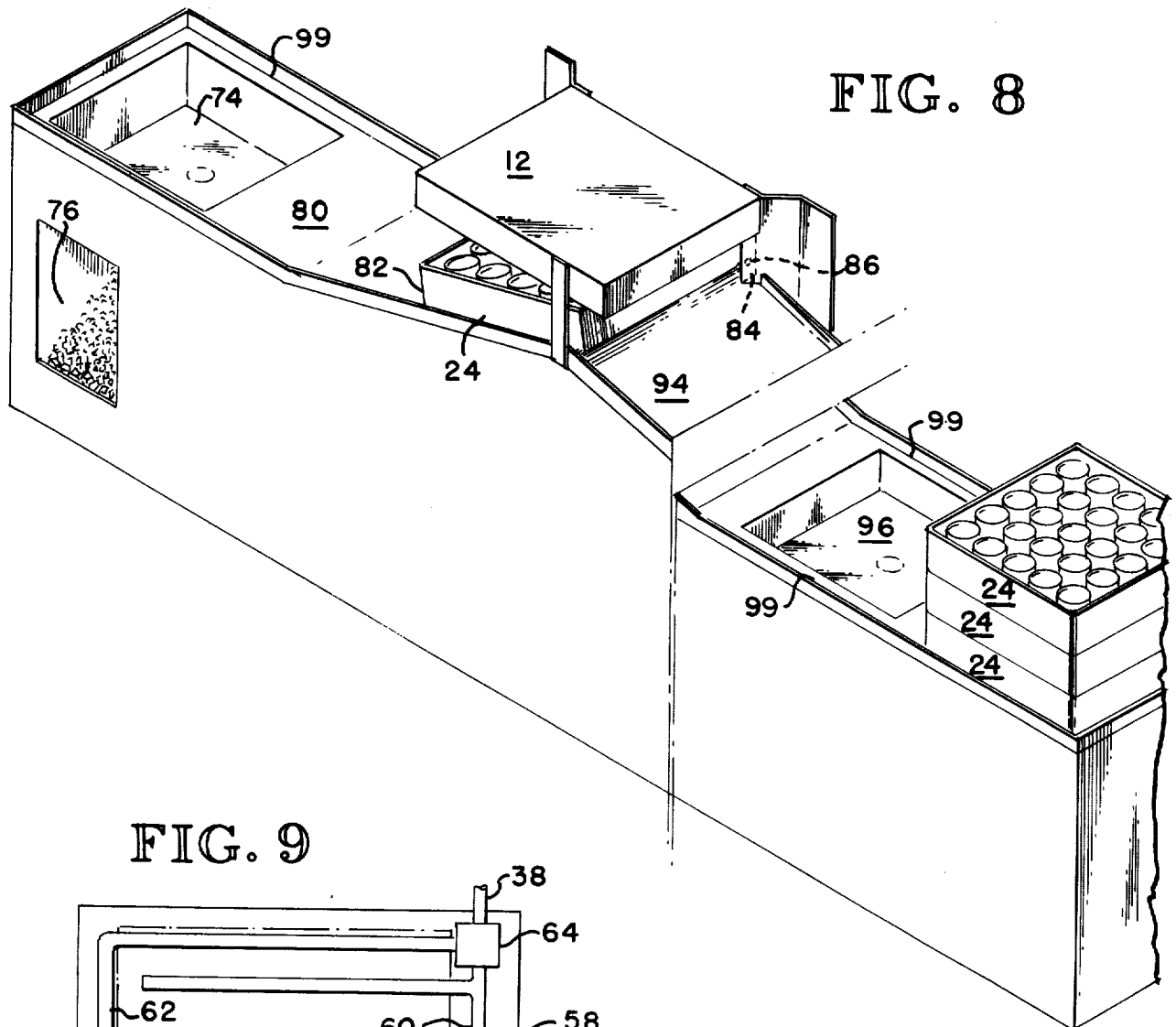
FIG. 8 is a partial perspective view of a typical glass icing, filling, leveling and draining system constructed according to the teachings of the instant invention.
FIG. 9 is a sectional plan view of a typical branch pipe arrangement suitable for use with varying capacity racks including a portion of the distribution tube arrangement for 25 and 36 glass racks.
FIG. 10 is a schematic view of the rack positions when moved through the icing, filling, leveling and draining positions shown in the structure of FIG. 8.

Referring now to FIG. 9, a piping system 58 including alternate branch pipe systems 60 and 62 suitable for use with 25 and 36 glass capacity racks respectively, is disclosed including a three-way valve 64 whereby water may be directed to either of branch pipe systems 60 or 62 or turned off. Glasses 66 of a size suitable for storage in a 25 glass capacity rack 24 are shown in full line in FIG. 9, while in dashed line, glasses 68 of a size suitable for storage in a 36 glass capacity rack are also disclosed super-imposed thereon. Distribution tubes 70 mounted on branch pipes 60 are shown extending over the glasses 66, while distribution tubes 72 associated with branch pipes 62 are shown extending over glasses 68. The system of FIG. 9 provides substantial versatility in situations where varying sized water glasses or goblets are used in conjunction with different meals or banquets in a restaurant facility.

A complete system for icing, filling, leveling and draining racks of water glasses 24 is disclosed in FIG. 8 including a sink 74 over which a rack of empty glasses is initially positioned while scoops of ice taken from ice storage cabinet 76 are distributed therein, the excess ice falling through the rack into the sink. Referring additionally to FIG. 10, the general position of the rack 24 on the rack support counter during icing is illustrated at 78.

After icing, rack 24 is manually slid along counter top 80 up incline 82 to a point beneath filling cabinet 12 where the rack contacts curb 84 actuating water flow switch 86 positioned thereon to initiate water flow into the glasses mounted in rack 24. Referring to FIG. 10, the relative position of the rack of glasses during filling is shown at 88.

Mounting the glasses on the sloped portion 82 of the counter during filling allows the water level in the glasses to be equalized by simply filling all of the glasses to the point of overflowing such that when the tray is again leveled a desired water level is obtained in the manner discussed heretofore with reference to FIG. 4. Excess water spilling from the glasses drains back to sink 74.

In one embodiment, when the glasses are filled to over-flowing, the operator slides the tray 24 in the direction of arrow 90 in FIG. 10 to release switch 86 to stop the flow of water into the glasses. Alternately, a timing mechanism may be used to shut off the flow of water into the glasses. After movement of the tray to the position 92 in FIG. 10, the tray is moved down the sloping portion 94 of the counter and over a sink 96 shown in FIG. 10 at position 98 where excess water is allowed to drain from the outside of the glasses and from the rack prior to its being stacked as shown in FIG. 8 whereupon the filled water glasses are ready for distribution. Commonly, the rack supporting counter will be positioned at a level approximately 36 inches above the floor with the sloping portion of the counter rising somewhat thereabove. It will be understood that a water level equalizing system such as that shown in FIG. 1 wherein the glasses are filled while the rack is positioned horizontally and then the water levels equalized after filling may be substituted for the sloped filling structure of FIG. 8. Standard square glass racks have a side length of approximately 20 inches and thus it will be understood that in a structure suitable for use with such standard racks, the width of the rack support counter will be slightly larger than 20 inches while the width of the sinks 74 and 96 will be less than 20 inches to allow the racks to be slid thereover on the ledges 99 on the lateral sides of the sink.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. Apparatus for simultaneously filling a plurality of glasses in racks of varying size with ice water including:
   a rack supporting counter having glass icing, filling, leveling and draining stations;
   said glass filling station including a water supply pipe, three-way valve means regulating the flow of water from said supply pipe, first and second sets of branch pipe means separately selectively interconnectable with said water supply pipe by said three-way valve means, a plurality of distribution tubes mounted on the top surface of said branch pipes and extending outwardly to points above each glass in a rack positioned therebeneath;
   said glass filling station further including a cabinet enclosing said sets of branch pipes and said distribution tubes and including a bottom plate having a plurality of holes therein, each hole being associated with the outlet end of one of said distribution tubes;
   said rack supporting counter including an inclined portion over which a rack of filled glasses is moved to cause a portion of the water therein to spill to equalize the level of water in all glasses in said rack; and,
   drain means on said counter associated with said filled glass draining station to collect water spilled from said glass.

2. Apparatus according to claim 1, wherein said first set of branch pipes include two pipes having 25 distribution tubes mounted thereon and said second set of branch pipes include three pipes having 36 distribution tubes mounted thereon.

3. Apparatus according to claim 2, wherein each of said distribution tubes is mounted on the top surface of the associated branch pipe to maintain the branch pipe filled with water when said three-way valve means is closed.

4. Apparatus according to claim 3, further comprising positioning means below said cabinet allowing repetitive positioning of racks of glasses immediately below the holes in the bottom plate thereof.

5. Apparatus according to claim 1, wherein each of said distribution tubes is mounted on the top surface of the associated branch pipe to maintain the branch pipe filled with water when said three-way valve means is closed.

6. Apparatus according to claim 5, further comprising positioning means below said cabinet allowing repetitive positioning of racks of glasses immediately below the holes in the bottom plate thereof.

7. Apparatus according to claim 1, further comprising positioning means below said cabinet allowing repetitive positioning of racks of glasses immediately below the holes in the bottom plate thereof.

* * * * *